United States Patent
Geerets

(10) Patent No.: US 7,862,109 B2
(45) Date of Patent: Jan. 4, 2011

(54) OPEN ROOF CONSTRUCTION

(75) Inventor: Joseph Gerardus Henricus Geerets, Horst (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 12/244,961

(22) Filed: Oct. 3, 2008

(65) Prior Publication Data
US 2009/0091160 A1    Apr. 9, 2009

(30) Foreign Application Priority Data
Oct. 8, 2007    (EP)    .................... 07118023

(51) Int. Cl.
*B60J 7/22*    (2006.01)
(52) U.S. Cl. .................................... 296/217
(58) Field of Classification Search .............. 296/217
See application file for complete search history.

(56) References Cited

U.S. PATENT DOCUMENTS

| | | | |
|---|---|---|---|
| 5,484,184 A | | 1/1996 | Kohlpaintner |
| 6,030,031 A | * | 2/2000 | Martinus Lenkens ....... 296/217 |
| 6,457,769 B2 | * | 10/2002 | Hertel et al. ................ 296/217 |
| 2001/0019217 A1 | | 9/2001 | Hertel |
| 2008/0036247 A1 | * | 2/2008 | Park ........................... 296/217 |

FOREIGN PATENT DOCUMENTS

| | | |
|---|---|---|
| DE | 3308065 | 9/1983 |
| DE | 4403163 | 3/1995 |
| DE | 10304506 | 8/2004 |
| EP | 1112875 | 7/2001 |

OTHER PUBLICATIONS

Official Search Report of the European Patent Office in counterpart foreign application No. EP 07118023.6 filed Oct. 8, 2007.

\* cited by examiner

*Primary Examiner*—Dennis H Pedder
(74) *Attorney, Agent, or Firm*—Steven M. Koehler; Westman, Champlin & Kelly, P.A.

(57) ABSTRACT

An open roof construction for a vehicle comprises a roof opening in a fixed roof part and a roof assembly having a movable panel for opening and closing said roof opening. At opposite sides of the panel flexible cover members are provided for covering lateral gaps created when the panel moves towards an open position. Further it comprises two guide members extending along corresponding opposite sides of the roof opening for guiding respective parts of the open roof construction. The cover members are integrally connected with the respective guide members.

20 Claims, 1 Drawing Sheet

OPEN ROOF CONSTRUCTION

BACKGROUND

The discussion below is merely provided for general background information and is not intended to be used as an aid in determining the scope of the claimed subject matter.

The invention relates to an open roof construction for a vehicle, comprising a roof assembly for a roof opening in a fixed roof part. The roof assembly includes a movable panel for opening and closing said roof opening, wherein at opposite sides of the panel flexible cover members are provided for covering lateral gaps created when the panel moves towards an open position, and further comprising two guide members extending along corresponding opposite sides of the roof opening for guiding respective parts of the open roof construction.

An open roof construction of the type referred to above is known from DE-C-44 03 163. The cover members are provided to prevent injury to an occupant of the vehicle when the open roof construction is operated and the panel is moved. The cover members are attached to the guide members in a sliding manner.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

As an aspect of the present invention, the open roof construction includes the cover members that are integrally connected with the respective guide members.

In accordance with exemplary embodiments of the open roof construction, the cover member and respective guide member are made of the same material, for example a plastic material.

According to other exemplary embodiments of the open roof construction, the cover member and respective guide member are made of different materials which are integrally interconnected during the manufacture of the assembly of cover member and guide member. For example the cover member and guide member may be manufactured by a two-step molding process.

Although the present invention is applicable to many types of cover members, in one embodiment the cover member is bellows-shaped.

The open roof construction and roof assembly thereof in accordance with the present invention offers the advantage of a simple construction, which is easy and quick to mount without the use of complicated fastening means.

BRIEF DESCRIPTION OF THE DRAWINGS

Hereinafter the invention will be elucidated while referring to the drawing, in which FIG. 1 schematically shows a perspective view of an open roof construction of the type to which the invention applies.

DETAILED DESCRIPTION OF THE ILLUSTRATIVE EMBODIMENT

Figure 1:
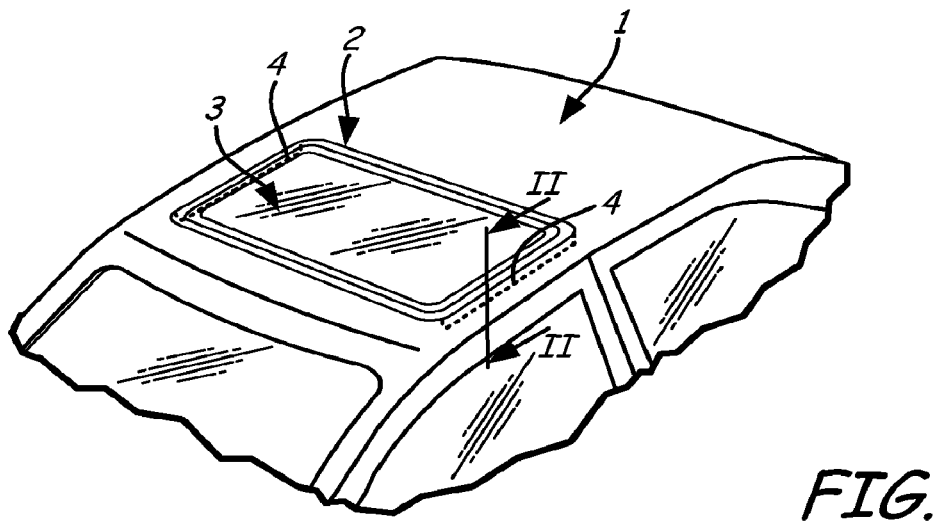

Firstly referring to FIG. 1, part of a vehicle is shown comprising a fixed roof part 1 in which a roof opening 2 is defined. A panel 3 is provided which may be moved in any desired manner (e.g. in sliding and/or tilting positions as is well known using operating devices known to those in the art, and thus not further illustrated in detail here). In general, panel 3 is moved between a position for closing the roof opening 2 (as shown in FIG. 1) and a position for fully or partially freeing the roof opening 2.

At opposite lateral sides of the roof opening 2 guide members 4 are provided (in FIG. 1 guide members 4 have been schematically indicated by dotted lines) which are part of the open roof construction and play a role in guiding moving parts thereof, such as for example lateral edges of a sliding sun screen.

Figure 2:
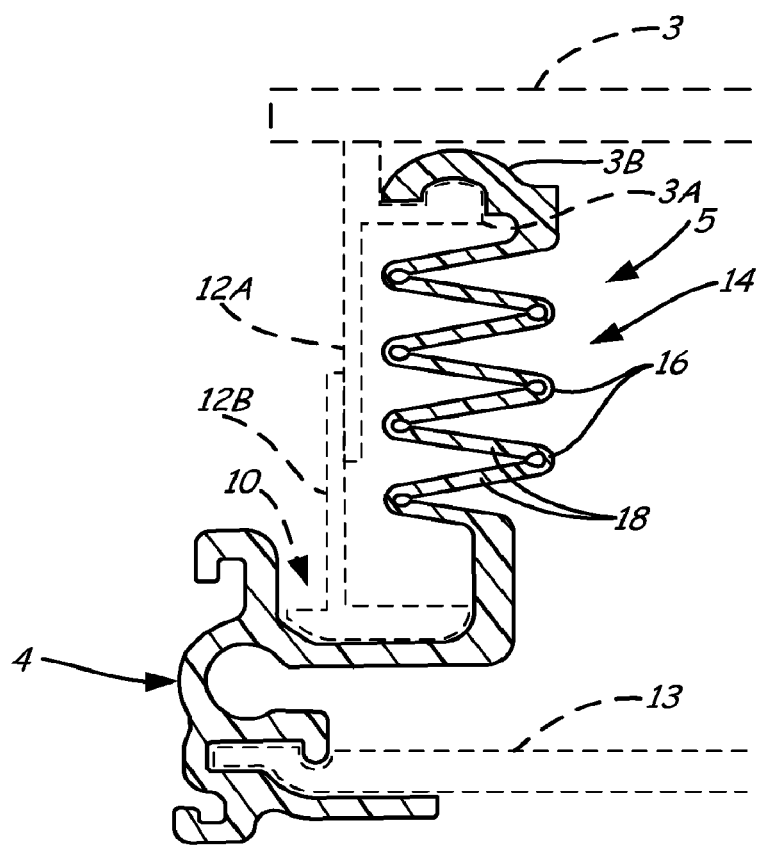
FIG. 2 shows, on a larger scale, a cross-sectional view of an embodiment of an assembly of guide member and cover member according to the present invention.

Referring to FIG. 2 a cross section in accordance with II-II in FIG. 1 is shown illustrating an assembly of guide member 4 and cover member 5.

Generally the operating device for the panel 3 includes slides 10 (schematically shown) that may be guided on guides 4, but also can be guided in other longitudinal guides on opposite sides of roof opening 2, the longitudinal guides of which can be separate from or formed integral from a single unitary body with a guide member 4. The slides 10 are coupled to panel 3 and include displaceable portions 12A, 12B such as articulated lever(s) that are used to tilt panel 3 from the closed position to various open positions. The slides 10 are displaced and operated by drive cables that in turn are driven by a motor or hand crank (not shown).

It should be noted that in FIG. 2 the stationary roof part 1 to which the illustrated guide member 4 is attached, is not illustrated. It will be clear, however, that for such an attachment the guide member 4 may be provided with appropriate securing or fastening devices such as clamps, nuts, bolts, screws and the like, as is known per se (not illustrated either). Further it will be clear that the guide member 4 will cooperate in a manner known in the field with any part of the open roof construction that is intended to move relative thereto, such as a movable sun screen 13 which with its opposite lateral edges is guided in opposite portions of the guide members 4.

As follows from FIG. 2, the cover member 5 and guide member 4 are integrally connected. The expression "integrally connected" indicates that the cover member 5 and guide member 4 form a single part without the use of any connecting means for connecting them. For example it is possible that the cover member 5 and respective guide member 4 are made of the same material (this could mean that there is no clear and well defined transition between both members).

In a first embodiment, the cover member 5 and respective guide member 4 are made of a plastic material, which combines the characteristics which are needed for application in the cover member 5 (among which flexibility) and in the guide member 4 (among which durability and wear resistance).

In a second embodiment, however, it is possible that the cover member 5 and respective guide member 4 are made of different materials which are integrally interconnected during the manufacture of the assembly of cover member 5 and guide member 4. Although, therefore, both members are made of different materials the integral connection thereof is assured during the manufacture of the assembly of cover member and guide member, again resulting in a single part without the use of any connecting means.

Evidently the guide member 4 will have a shape adapted to its intended use. The same applies for the cover member 5. The cover member 5 will extend upwardly to cover a lateral gap which is created when the panel 3 is moved towards a position in which the roof opening 2 is at least partially opened. Because the cover member 5 is attached with its upper end to a moving part, panel 3 (herein represented by hooked portions 3A and 3B of the panel 3 and cover member 5, respectively, that represent a sliding connection to allow sliding movement of the panel 3 relative to the cover member 5 although other forms of connections can be used, depending on the movement of the panel 3) and with its lower end to a stationary part (guide member 4) it has to be deformable. One way in which this can be achieved has been represented in FIG. 2. There the cover member 5 is bellows-shaped having bellows 14 formed by areas 16 of reduced thickness between portions 18, both of which extend along at least some of the longitudinal length of the guide members 4.

The flexibility of the cover member 5 extends along at least some of the longitudinal length of the guide member 4, and as such spans the lateral gap between the panel 5 and the guide member 4 whether the spacing of the gap is constant or varied along the longitudinal length of the guide member 4. For example, the height of the lateral gap can vary when the panel 3 is titled relative to the guide member 4.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims

What is claimed is:

1. An open roof construction for a vehicle, comprising a roof opening in a fixed roof part and a movable panel for opening and closing said roof opening, a pair of single one-part flexible cover members configured to cover lateral gaps created when the panel moves towards an open position, and further comprising two stationary guide members extending along corresponding opposite sides of the roof opening for guiding respective parts of the open roof construction, wherein each cover member and respective stationary guide member are integrally connected being formed as single part without the use of any connecting means to provide the connection therebetween; and wherein each cover member includes an upper portion in the form of a curved hook to engage and allow sliding movement relative to the panel, each upper portion being remote from each corresponding stationary guide member.

2. The open roof construction according to claim 1, wherein the cover member and respective guide member are made of the same material.

3. The open roof construction according to claim 2, wherein the cover member and respective guide member are made of a plastic material.

4. The open roof construction according to claim 1, wherein the cover member and respective guide member are made of different materials which are integrally interconnected during the manufacture of the assembly of cover member and guide member.

5. The open roof construction according to claim 1, wherein the cover member includes bellows.

6. A roof assembly for an open roof construction for a vehicle, the roof assembly comprising:
a movable panel configured to open and close a roof opening in the vehicle;
wherein at opposite sides of the panel, a single flexible cover member is provided on each side of the panel, wherein the flexible cover members are configured to extend to cover respective lateral gaps created when the panel moves towards an open position; and
two guide members configured to guide the panel and extending along corresponding opposite sides of the panel, wherein each cover member and respective guide member are integrally connected being formed as single part and not requiring the use of any connecting device to provide the connection therebetween; and wherein each cover member includes an upper portion in the form of a curved hook to engage and allow sliding movement relative to the panel, each upper portion being remote from each corresponding stationary guide member.

7. The roof assembly according to claim 6, wherein the cover member and respective guide member are made of the same material.

8. The roof assembly according to claim 7, wherein the cover member and respective guide member are made of a plastic material.

9. The roof assembly according to claim 6, wherein the cover member and respective guide member are made of different materials which are integrally interconnected during the manufacture of the assembly of cover member and guide member.

10. The roof assembly according to claim 6, wherein the cover member includes bellows.

11. The roof assembly according to claim 6 wherein the bellows comprise first portions and second portions, wherein a second portion is disposed between successive first portions and wherein each of the second portions have a thickness less than adjacent first portions.

12. The roof assembly of claim 6 wherein the stationary guide members and corresponding cover member are integrally connected with a structure from a two-step molding process.

13. The roof assembly of claim 6 wherein each of the upper portions includes a recess opening toward the corresponding stationary guide member and having a sliding surface.

14. The roof assembly of claim 13 wherein the cover member includes bellows connecting each upper portion to each corresponding stationary guide member, wherein the bellows are joined to only one side of the upper portion so as to have a free side remote from said only one side joined to the bellows.

15. The roof assembly of claim 14 wherein the cover members engage the panel such that the free side of the upper portion faces outwardly away from a center portion of the panel.

16. The open roof construction of claim 1 wherein the stationary guide members and corresponding cover member are integrally connected with a structure from a two-step molding process.

17. A roof assembly for an open roof construction for a vehicle, the roof assembly comprising:
a movable panel configured to open and close a roof opening in the vehicle;
wherein at opposite sides of the panel, a flexible cover member is provided on each side of the panel, wherein the flexible cover members are configured to extend to cover respective lateral gaps created when the panel moves towards an open position, each cover member having a guide member configured to guide the panel and extending along corresponding opposite sides of the panel, wherein each cover member and respective guide member are integrally connected being formed as single part; and wherein each cover member includes an upper portion in the form of a hook to engage and allow sliding movement of the panel relative, each upper portion being remote from each corresponding stationary guide member and having a recess opening toward the corresponding stationary guide member and having a sliding surface wherein a only one side of the upper portion adjacent the recess extends toward and is connected to the corresponding stationary guide member.

18. The roof assembly of claim 17 wherein the cover member includes bellows connecting each upper portion to each corresponding stationary guide member, wherein the bellows are joined to said only one side of the upper portion so as to have a free side remote from said only one side joined to the bellows.

19. The roof assembly of claim 18 wherein the cover members engage the panel such that the free side of the upper portion faces outwardly away from a center portion of the panel.

20. The roof assembly according to claim 18 wherein the bellows comprise first portions and second portions, wherein a second portion is disposed between successive first portions and wherein each of the second portions have a thickness less than adjacent first portions.

* * * * *